United States Patent [19]
Rager et al.

[11] 3,879,239
[45] Apr. 22, 1975

[54] METHOD OF PREPARING POLYVINYL CHLORIDE PARTS FOR ULTRASONIC WELDING

[75] Inventors: Horst Rager, Nurnberg; Herbert Röhrig, Schwarzenbruck-Gsteinach; Armin Hirschel, Fischbach, all of Germany

[73] Assignee: Kabel-und Metallwerke Gutehoffnungshutte Aktiengesellschaft, Hannover, Germany

[22] Filed: Feb. 6, 1973

[21] Appl. No.: 329,965

Related U.S. Application Data

[62] Division of Ser. No. 240,416, April 3, 1972, abandoned.

[52] U.S. Cl............. 156/73.1; 156/244; 260/41 R
[51] Int. Cl............................................ B32b 31/16
[58] Field of Search............. 156/73, 244; 260/41 R

[56] References Cited
UNITED STATES PATENTS

| | | | |
|---|---|---|---|
| 3,418,196 | 12/1968 | Luc................................. | 156/244 X |
| 3,453,173 | 7/1969 | Isley et al....................... | 156/244 X |
| 3,580,793 | 5/1971 | Hewitt............................. | 156/73 X |
| 3,634,165 | 1/1972 | Gliniecki........................ | 156/244 |

OTHER PUBLICATIONS

Article by W. S. Pense, Title "PVC Technology," copyright by Maclaren & Sons Ltd., pages 121–123.

*Primary Examiner*—Edward G. Whitby
*Attorney, Agent, or Firm*—Ralf H. Siegemund

[57] ABSTRACT

Method of making plastic components using 100 parts of a soft PVC to which at least 25 parts (preferably 54 parts) acrylate resin and additional filler material is added. The mixture is, e.g., extruded and the extruded parts are welded by means of ultrasonic energy.

4 Claims, 3 Drawing Figures

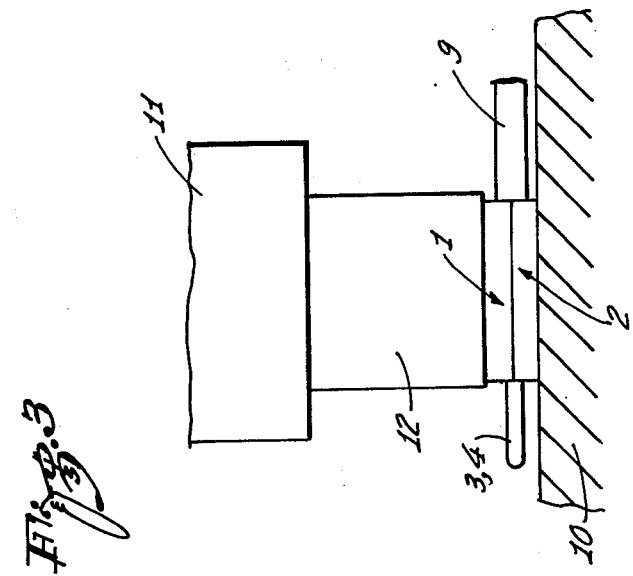
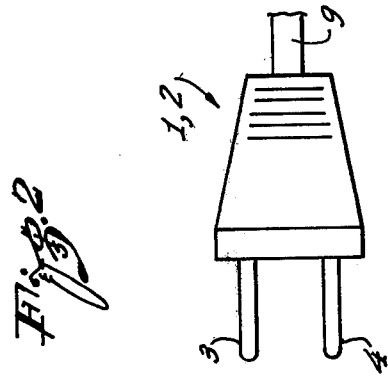
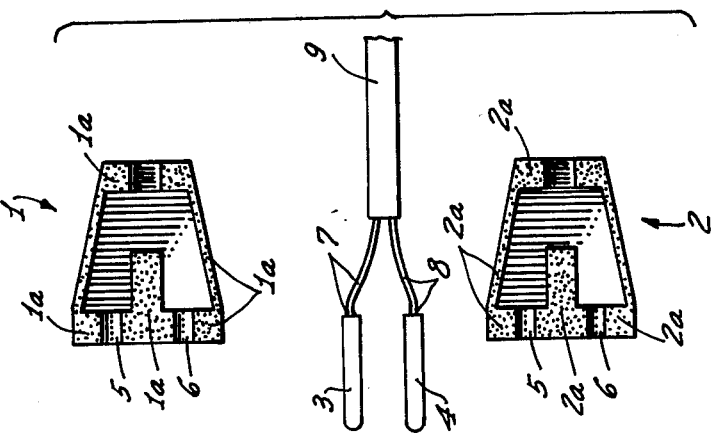

METHOD OF PREPARING POLYVINYL CHLORIDE PARTS FOR ULTRASONIC WELDING

This is a division of application Ser. No. 240,416, filed Apr. 3, 1972, now abandoned.

BACKGROUND OF THE INVENTION

The present invention relates to a method for making material and for preparing parts that can be welded by means of ultrasonic energy, the material to have polyvinyl chloride basis.

Ultrasonic welding is a technique which has become increasingly important, particularly for mass production of articles, such as, for example, plugs, electrical connectors, or the like. Such electrical connecting parts have to be made of insulating material and should be fixedly secured to the end of cables, conductors etc. Ultrasonic welding is particularly suited for making a reliable connection between different plastic parts. Furthermore, ultrasonic welding lends itself very well to automated manufacturing process, and it is always of advantage to use the same material for parts to be fused, which reduces costs. Supplementing parts and additions can readily be fused to principle parts when using ultrasonics for obtaining immediate structural integration. Such additions to plug elements may serve, for example, as tension relief so that separate parts do not have to be included separately for that purpose.

It was found that many plastics can be welded through application of ultrasonic energy. However, it is also known that the widely used polyvinyl chloride (PVC), in its presently known consistency, is not suitable for this welding technique. This is very unfortunate because PVC is a particularly good electrical insulator. Still, many plug elements are made from PVC, in spite of the fact that ultrasonic welding cannot be used in the assembly process and even though, other welding methods are both, more expensive and less reliable than ultrasonics. It should be mentioned that it is indeed widely known that PVC cannot be welded by ultrasonic energy, and vandors of ultrasonic welding equipment actually inform the customer of this unfortunate deficiency.

DESCRIPTION OF THE INVENTION

It is an object of the present invention to provide a method that permits ultrasonic welding of polyvinyl chloride parts. In accordance with the preferred embodiment of the present invention, it is suggested to make the parts to be welded from the following mixture:

100 parts of a soft, polyvinyl chloride are mixed with at least 25 parts acrylate resin, as well as with additional additives such as fillers; preferably 54 parts acrylate resin are used. The mixture is then, e.g., extruded to obtain particular parts. The invention offers the advantage that upon adding this kind of resin to polyvinyl chloride, the parts made of the resulting plastic material can be welded by means of ultrasonic energy. The several additives do not deteriorate the good insulative properties of PVC. Moreover, as an added advantage, it was found that parts made of that mixture have an extremely smooth surface.

The following example was found to be particularly advantageous and results in a product of very favorable insulative properties. Polyvinyl chloride having a softness or hardness (K-value) of 60 was used, whereby 100 parts of that material are mixed with 54 parts acrylate resin. In addition, this mixture receives 41.5 parts chalk and 44 parts diisononyl phthalate plus 5 parts stabilizing material and smoothing components (lubricants).

These materials may be mixed in granular consistency and heated to obtain an integrally, fused mass. Actually, the parts to be made are usually extruded, and the fusion may well occur during the extrusion process.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 shows the parts of a plug element to be connected to each other and receiving a conductor pair;

FIG. 2 shows the parts of FIG. 1 as assembled; and

FIG. 3 is a schematic representation of the ultrasonic welding process.

DESCRIPTION OF THE DRAWINGS

Two similar plug-halves, 1 and 2, have been made by extruding a PVC-acrylate mixture as described. They are now to be joined for obtaining a plug element. 3 and 4 are respectively two plug pins which are to be received individually by two indentations 5 and 6 of each of the parts 1 and 2. Wires 7 and 8 of a conductor pair or cable 9 are to be connected or are already connected to these pins. These being the components to be combined into a structural unit.

Upon making such an element, the plug pins 3 and 4 are disposed in the indentations 5 and 6 of part 2, and then these two pins are connected with wires 7 and 8 of cable 9 (e.g. welded, soldered, etc.). However, the pins may have been connected already previously to the wire ends; the sequence of these steps is not important for the invention. Next, part 1 is matingly positioned on part 2 and there results the configuration as shown in FIG. 2. The dotted areas, 1a and 2a, of parts 1 and 2, as shown in FIG. 1, are now juxtaposed in surface-to-surface contact. These are the surface areas to be fused by ultrasonic welding process.

Next, this as yet loosely assembled plug element is placed on a table 10 of an ultrasonic welding machine 11, and the plunger electrode 12 of the machine is lowered as shown in FIG. 3. Now, the two parts 1 and 2 are welded to each other. Not only are parts 1 and 2 fused by ultrasonic welding process, but depending on the material used as insulator sheathing for cable 9; that sheathing may or may not be bonded to the parts at the opening where the cable enters the interior of combined parts 1 and 2.

After the plunger 12 of the ultrasonic machine has been lifted off the plug element, the plug element with pins inserted as well as with inserted wire ends of the cable or conductor pair can be removed as a unit.

The particular advantage of the method in accordance with the invention is to be seen in that polyvinyl chloride components can be made at lower cost. Parts, such as 1 and 2 when made from polyvinyl chloride with the additives as mentioned above, can be joined and affixed to each other by means of ultrasonic welding. Therefor, this particular material, which is so advantageous in electrical engineering, can now be used for making parts to be combined by means of automatic ultrasonic welding method, and utilization of that welding method increases reliability and production yield.

The invention is not limited to the embodiments described above but all changes and modifications thereof not constituting departures from the spirit and scope of the invention are intended to be included.

We claim:

1. Method of making plastic components comprising the steps of:

providing a mixture of 100 parts of a soft PVC, of at least 25 parts acrylate resin and additional filler material;

making parts from the mixture of such contour so as to complement each other with regard to the overall contour of the components to make, each such component to consist of at least two parts; and joining the respective complementary parts by ultrasonic welding for obtaining each of the components.

2. Method in accordance with claim 1, wherein chalk is used as filler material.

3. Method in accordance with claim 1, wherein 100 parts PVC are mixed with 54 parts of acrylate resin.

4. Method as in claim 1, wherein the parts are made by extrusion.

* * * * *